A. K. TUPPER.
Stove Pipe.
No. 24,834.
Patented July 19, 1859.
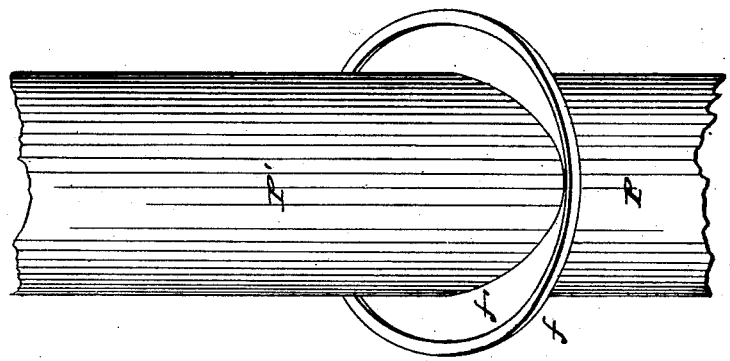
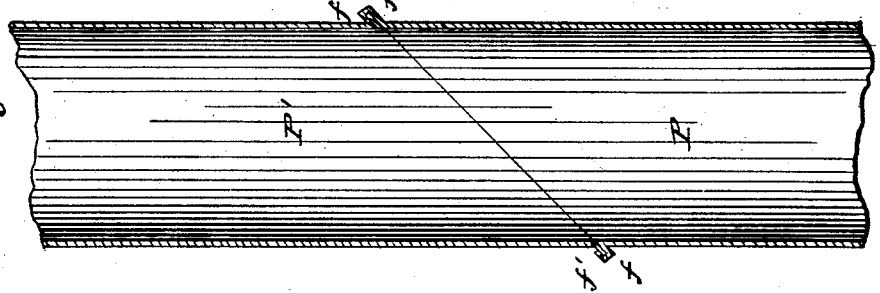
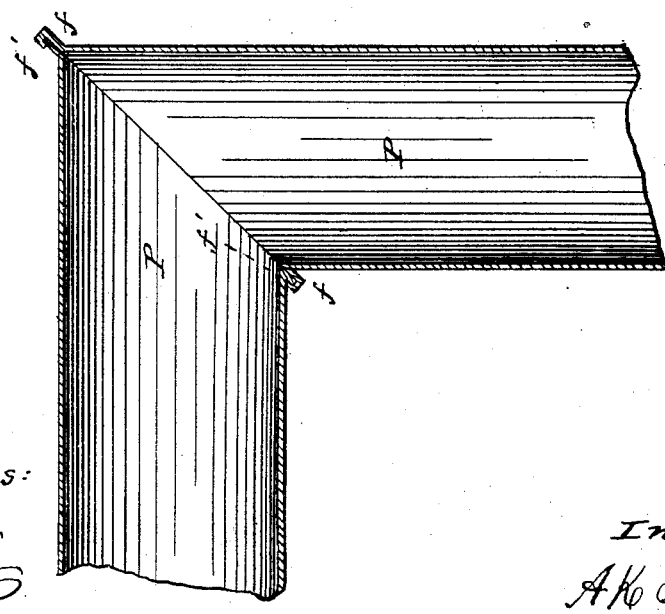

UNITED STATES PATENT OFFICE.

A. K. TUPPER, OF CLARKSTON, MICHIGAN.

ELBOW FOR STOVEPIPES.

Specification of Letters Patent No. 24,834, dated July 19, 1859.

*To all whom it may concern:*

Be it known that I, A. K. TUPPER, of Clarkston, in the county of Oakland and State of Michigan, have invented a new and useful Improvement in Stovepipe-Joints; and I do hereby declare that the following is a full, clear, and exact description of the same, reference being had to the annexed drawing, forming part of this specification, in the several figures of which similar characters of reference denote the same part.

Figure 1 is a sectional view through the center of the pipe, showing it turned at right angles. Fig. 2 is a sectional view of the same with the pipe perpendicular. Fig. 3, is a face view of pipe, in position of Fig 2.

This invention has for its object the construction of joints in stove pipes so as to allow them to be turned straight up, or at any angle whatever, and its nature consists in having a flange around each piece of pipe at their joint, the one lapping over the other, so that by turning one piece of the pipe the flange moves in the lap of the other, and the pipe can be turned at any desired angle.

In the drawing P, is the lower piece of pipe, having flange $f$, where it is joined to the other piece P', which has the flange $f'$, the flange $f$, overlapping the one $f'$. This joint is constructed at an angle of forty-five degrees, but by turning the piece P', the flange $f'$, will move in the lap of flange $f$, thus allowing the part P', to be turned entirely perpendicular or at any desired angle whatever.

Having thus described my invention, what I claim, and desire to secure by Letters Patent is,

Constructing the joint of pipes P, and P', with flange $f'$, and the overlapping flange $f$, so as to allow the pipe to be adjusted at any desired angle, substantially as described.

In testimony whereof I have hereunto signed my name before two subscribing witnesses.

A. K. TUPPER.

Witnesses:
W. N. DORSEY,
W. S. CLARY.